United States Patent

Wada et al.

[11] Patent Number: 6,009,364
[45] Date of Patent: Dec. 28, 1999

[54] POWER STEERING CONTROL APPARATUS FOR MOTOR VEHICLE

[75] Inventors: Shunichi Wada; Yasuo Naitou; Kazumichi Tsutsumi, all of Himeji, Japan

[73] Assignee: Mitsubishi Denki Kabushiki Kaisha, Tokyo, Japan

[21] Appl. No.: 08/131,684

[22] Filed: Oct. 5, 1993

[30] Foreign Application Priority Data

Oct. 9, 1992 [JP] Japan .................................. 4-271971
Oct. 13, 1992 [JP] Japan .................................. 4-274334

[51] Int. Cl.⁶ .................................................. B62D 5/04
[52] U.S. Cl. ............................. 701/43; 701/71; 701/84; 180/443
[58] Field of Search ........................ 364/424.05, 424.01, 364/426.03, 426.02; 180/79.1, 141, 142, 443, 408, 411; 303/95, 109; 701/41, 71, 74, 80, 84

[56] References Cited

U.S. PATENT DOCUMENTS

| | | | |
|---|---|---|---|
| 4,819,170 | 4/1989 | Shimizu ........................... | 364/424.05 |
| 4,957,182 | 9/1990 | Morishita et al. .................. | 180/79.1 |
| 4,961,474 | 10/1990 | Daido et al. ....................... | 180/79.1 |
| 4,984,647 | 1/1991 | Morishita et al. .................. | 180/79.1 |
| 5,040,630 | 8/1991 | Morishita et al. .................. | 180/79.1 |
| 5,086,859 | 2/1992 | Takahashi et al. .................. | 180/79.1 |
| 5,088,040 | 2/1992 | Matsuda et al. .................... | 364/424.05 |
| 5,104,204 | 4/1992 | Naito et al. ........................ | 303/107 |
| 5,210,690 | 5/1993 | Kageyama et al. .................. | 364/426.02 |
| 5,216,608 | 6/1993 | Ito et al. ........................... | 364/426.03 |
| 5,229,955 | 7/1993 | Nishiwaki et al. .................. | 364/550 |
| 5,238,077 | 8/1993 | Vaughn et al. ..................... | 180/140 |
| 5,259,473 | 11/1993 | Nishimoto .......................... | 180/79.1 |
| 5,261,503 | 11/1993 | Yasui ................................. | 364/424.05 |

FOREIGN PATENT DOCUMENTS 0343693  11/1989  European Pat. Off. .

*Primary Examiner*—Tan Nguyen
*Attorney, Agent, or Firm*—Sughrue, Mion, Zinn, Macpeak & Seas, PLLC

[57] ABSTRACT

A power steering control apparatus for a motor vehicle which ensures an appropriate steering force conforming to the prevailing road condition and hence the safety for the motor vehicle even when the wheels are locked due to hard brake applied on a slippery road. The apparatus includes a first microcomputer for determining a driving torque of a steering assist motor on the basis of steering torque information generated upon steering of a steering wheel and pseudo vehicle speed information to thereby generate and output a driving signal for the steering assist motor on the basis of the driving torque, and a second microcomputer for generating the pseudo vehicle speed signal on the basis of wheel rotation speed signals and acceleration/deceleration signal of the motor vehicle to thereby generate and output a brake actuation signal for wheels of the motor vehicle on the basis of the pseudo vehicle speed signal, the acceleration/deceleration information and brake application information. The first microcomputer may further include a memory for storing steering assist characteristics according to which the torque of the assist motor is changed.

2 Claims, 4 Drawing Sheets

POWER STEERING CONTROL APPARATUS FOR MOTOR VEHICLE

BACKGROUND OF THE INVENTION

1. Field of the Invention

The present invention relates to a power steering control apparatus for assisting manipulation or handling of a steering wheel of a motor vehicle on the basis of steering torque information and vehicle speed information. More particularly, the present invention is concerned with a power steering control apparatus in which information available from a so-called anti-skid brake system adapted to control a brake force applied to the motor vehicle in dependence on rotation speed information of wheels of the motor vehicle is effectively made use of.

2. Description of the Related Art

For a better understanding of the present invention, the background techniques thereof will first be described.

FIG. 5 is a block diagram showing a structure of a power steering control apparatus known heretofore. Referring to the figure, the power steering control apparatus is comprised of a power steering controller 20 which is constituted by a microcomputer 4 and which includes an interface 3 through which output signals of various sensors including a torque sensor (indicated only schematically at reference numeral 1) for detecting a steering torque (or angular position) of a steering wheel 1a (also shown only schematically), first and second vehicle speed sensors 2a and 2b for detecting the speed of the motor vehicle relative to ground and others are input to the microcomputer 4, which is so programmed as to calculate a steering assist force on the basis of the steering torque information, which is generated upon steering of a steering wheel and indicative of a steering torque imparted to the steering wheel by a driver of the motor vehicle, and the vehicle speed as input while taking into account the steering direction. For the purpose of ensuring a fail-safe feature for the motor vehicle as described later on, an auxiliary microcomputer 5 is provided for processing the input information supplied via the interface 3 in the similar manner as the main microcomputer 4.

A fail-safe relay 6 is connected to output terminals of the main microcomputer 4 and the auxiliary microcomputer 5 for supplying an electric power from a battery 7 to a motor drive circuit 8 and a clutch actuation circuit 10 in response to control output signals generated by the microcomputers 4 and 5. To this end, the motor drive circuit 8 has an output terminal for supplying a driving signal to a DC motor constituting a part of a steering assist actuator 9 in response to the control signals output from the microcomputers 4 and 5. Further, a clutch driving circuit 10 is connected to output terminals of the main and auxiliary microcomputers 4 and 5 for supplying a driving signal to a clutch actuator 11 in response to the output signals of the main and auxiliary microcomputers 4 and 5.

As is apparent from the above description, the power steering control apparatus shown in FIG. 5 includes two microcomputers 4 and 5, wherein the fail-safe relay 6 is electrically energized to supply the control signal to the DC motor of the steering assist actuator 9 only when the conditions for driving the DC motor as determined by both of the microcomputers 4 and 5 coincide with each other. In other words, only when the results of calculations or arithmetic operations performed by both the microcomputers 4 and 5 coincide with each other, the control signal is issued to the DC motor of the steering assist actuator 9, whereby safety is ensured for the operation of the motor vehicle by virtue of the so-called fail-safe feature.

The power steering control apparatus known heretofore however suffers from the following problems. First, because the steering assist force is determined on the basis of the outputs of the torque sensor 1 and the vehicle speed sensors 2a and 2b, there arises a possibility that the steering force optimal to the road condition can not be determined unless the vehicle speed is detected correctly. In this regard, it should be mentioned that the vehicle speed is generally detected on the basis of rotation speeds of the driving wheels of the motor vehicle. Consequently, when the wheels are locked, for example, upon application of a hard or heavy brake (e.g., emergency brake) in the course of running on a road such as a snow-covered road where slippage is very likely to occur, the motor vehicle will continue to run in spite of stoppage of rotation of the driving wheels (i.e., locking of the driving wheels). In that case, the vehicle speed can no more be detected correctly, which in turn means that the steering assist force is erroneously determined. Another problem can be seen in that when the hard brake is applied in the course of running on a slippery road surface, the steering wheel may assume a so-called floating state under application of a steering assist force determined incorrectly for the reason mentioned above, whereby difficulty is involved in manipulating the steering wheel and hence in maneuvering the motor vehicle.

SUMMARY OF THE INVENTION

In the light of the state of the art described above, it is an object of the present invention to provide a power steering control apparatus for a Motor vehicle which is substantially immune to the above-mentioned problems of the power steering control apparatus known heretofore, and which can ensure safety for the operation of the motor vehicle by determining a steering force appropriate or optimal to the prevailing road condition even when the driving wheels are locked due to hard brake (e.g., emergency brake) on a road such as a snow-covered road where slippage is likely to occur.

Another object of the present invention is to provide a power steering control apparatus which can ensure safety for operation of the motor vehicle by altering or modifying the steering assist characteristics of the apparatus when locking of the driving wheels of the motor vehicle is about to take place upon application of a hard brake to the motor vehicle in the course of running on a slippery road.

For achieving the above and other objects which will become apparent as description proceeds, it is taught according to the present invention to effectively utilize the brake detection information generated in an anti-skid brake system known heretofore for controlling the steering assist force applied to a steering wheel of a motor vehicle for assisting a driver in maneuvering the motor vehicle.

Thus, there is provided according to a first aspect of the present invention a power steering control apparatus for a motor vehicle, which apparatus comprises: first control means for determining a driving torque for a steering assist motor on the basis of steering torque information, indicative of a steering torque of a steering wheel generated upon operation of the steering wheel by a driver of the motor vehicle, and pseudo vehicle speed information indicative of an estimated vehicle speed to thereby generate a driving signal for the steering assist motor on the basis of the driving torque, and second control means for generating the pseudo vehicle speed information on the basis of wheel rotation speed information of wheels of the motor vehicle and acceleration/deceleration information of the motor vehicle to thereby generate a brake actuation signal for the wheels of the motor vehicle on the basis of the pseudo vehicle speed signal, the acceleration/deceleration information and brake detection information.

Further, according to a second aspect of the invention, there is provided a power steering control apparatus for a motor vehicle, which apparatus comprises: first control means for determining a driving torque of a steering assist motor for a steering wheel of the motor vehicle on the basis of steering torque information, indicative of a steering torque of a steering wheel generated upon operation of the steering wheel by a driver of the motor vehicle, and vehicle speed information to thereby generate a driving signal for the steering assist motor on the basis of the driving torque; second control means for generating a brake actuation signal for wheels of the motor vehicle on the basis of wheel rotation speed information and brake effort detection information; and means for changing steering assist characteristics of the apparatus for correspondingly controlling the steering assist motor in response to the brake actuation signal output from the second control means.

According to a third aspect of the invention, there is provided a power steering control apparatus, which comprises: first control means for determining a driving torque of a steering assist motor for a steering wheel of the motor vehicle on the basis of steering torque information, indicative of a steering torque of a steering wheel generated upon operation of the steering wheel by a driver of the motor vehicle, and vehicle speed information to thereby generate a driving signal for the steering assist motor on the basis of the driving torque; second control means for generating a brake actuation signal for wheels of the motor vehicle on the basis of wheel rotation speed information and brake effort detection information; road friction coefficient estimating means for estimating a coefficient of friction of a road surface on the basis of the wheel rotation speed information; and means for changing steering control characteristics for correspondingly controlling the steering assist motor in dependence on the friction coefficient of the road surface estimated by the road friction coefficient estimating means upon generation of the brake actuation signal.

In a preferred mode for carrying out the invention, the first control means may be so designed as to determine a driving direction and a driving torque of a steering assist motor on the basis of steering torque information generated upon steering of a steering wheel and the pseudo vehicle speed information to thereby generate and output a driving signal for the steering assist motor on the basis of the driving direction and the driving torque.

With the structures of the power steering control apparatus described above, there can always be assured an appropriate or optimal steering assist force to be applied to the steering wheel even when locking of the wheels of the motor vehicle takes place owing to such an arrangement that the pseudo vehicle speed information is generated on the basis of the wheel rotation speed information and the vehicle acceleration/deceleration information, wherein the driving torque command for the steering assist motor is determined on the basis of the pseudo vehicle speed information and the steering torque information generated upon manipulation of the steering wheel to thereby generate the driving signal for the steering assist motor on the basis of the driving torque information.

Further, by incorporating the road surface friction coefficient estimating means for estimating the coefficient of friction of a road surface on the basis of the wheel rotation speed information to thereby change the steering assist characteristics on the basis of the estimated road friction coefficient upon application of the brake, the steering assist performance of the steering control apparatus can significantly be improved.

Besides, by taking into account the driving information of the steering assist motor in determination of the driving torque, the reliability of the power steering control can further be enhanced.

The above and other objects, features and attendant advantages of the present invention will more clearly be understood by reading the following description of the preferred embodiments thereof taken, only byway of example, in conjunction with the drawings.

DESCRIPTION OF THE PREFERRED EMBODIMENTS

Now, the present invention will be described in detail in conjunction with the preferred or exemplary embodiments thereof by reference to the drawings.

Embodiment 1

Figure 1:
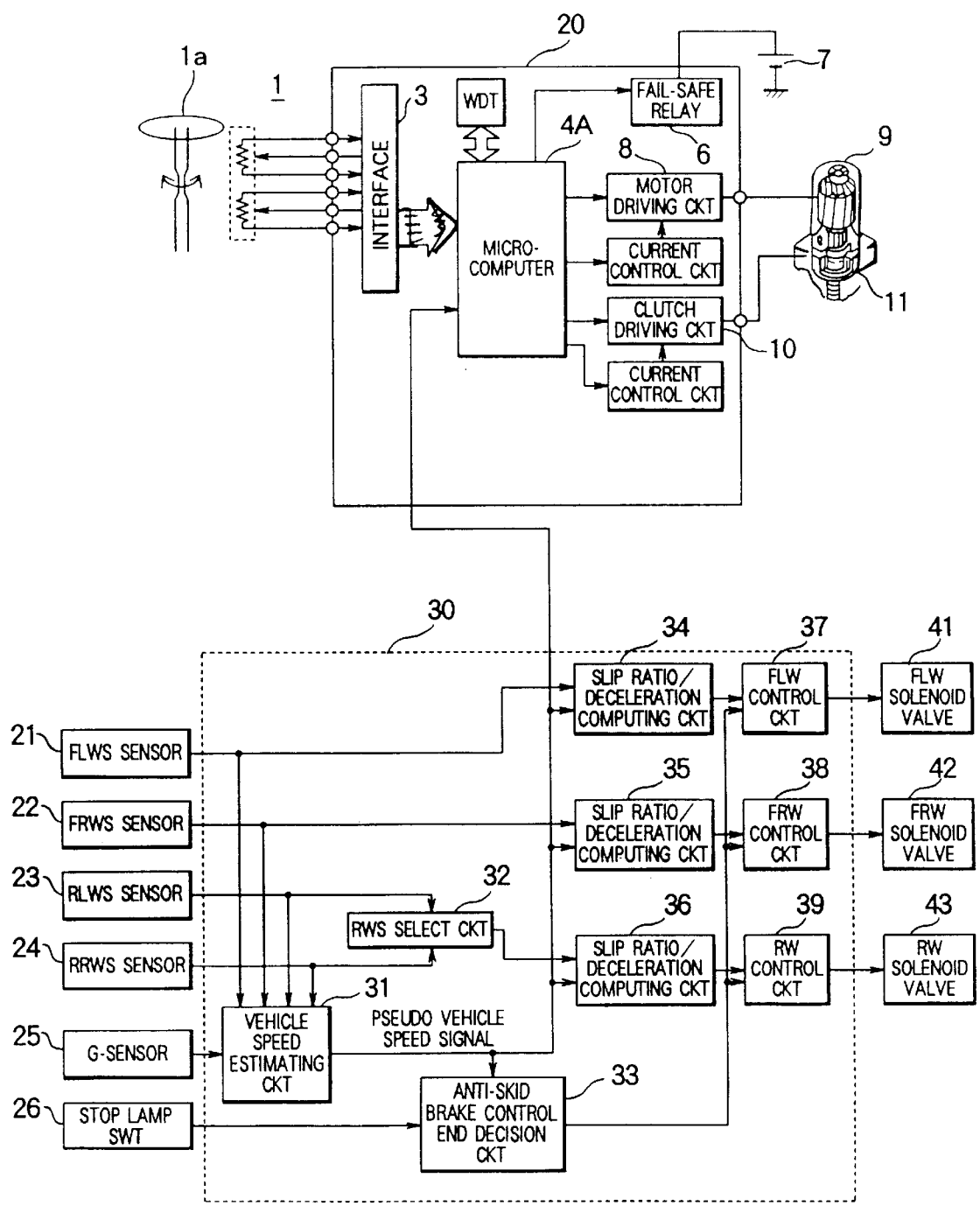
FIG. 1 is a block diagram showing a structure of a power steering control apparatus according to an embodiment of the present invention.
Figure 5:
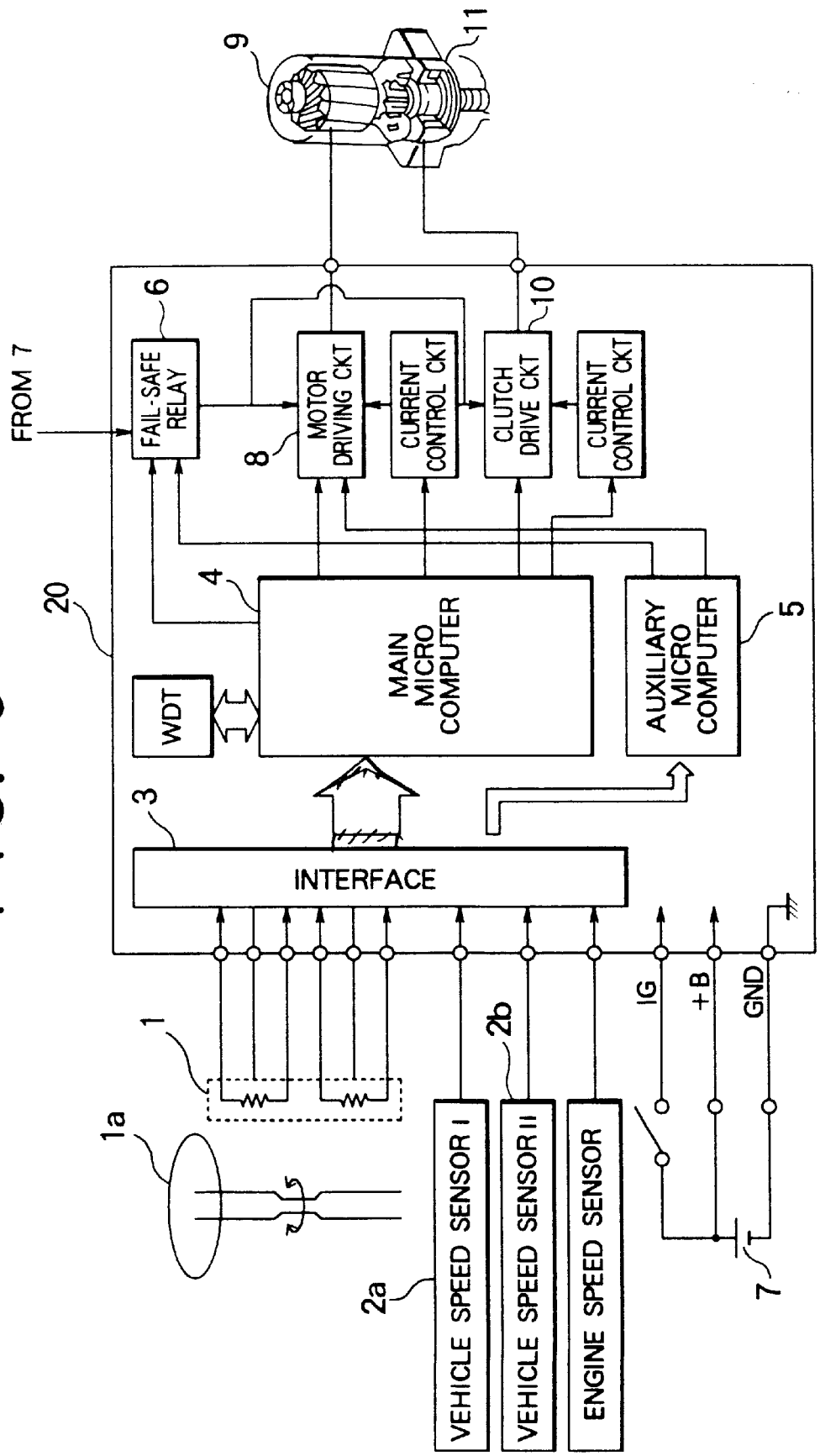
FIG. 5 is a block diagram showing a structure of a power steering control apparatus known heretofore.

FIG. 1 is a block diagram showing a general arrangement of a power steering control apparatus according to a first embodiment of the present invention. In this figure, parts same as or equivalent to those shown in FIG. 5 are denoted by like reference symbols and repeated description thereof is omitted.

Referring to FIG. 1, there is provided according to the invention incarnated in this embodiment a power steering controller 20 which is comprised of a microcomputer 4A serving for determining a driving direction of the DC motor 9 on the basis of the steering torque information output from the torque sensor 1 and input to the microcomputer 4A through the interface 3 and at the same time determining a driving torque of the DC motor 9 on the basis of the steering torque information mentioned above and a pseudo vehicle speed signal supplied from a microcomputer incorporated in the anti-skid braking system described later on, whereby a direction-of-rotation command signal and a torque command signal are generated for the DC motor 9 on the basis of the driving direction information and the driving torque mentioned above.

The power steering control apparatus according to the instant embodiment is further provided with a first wheel speed sensor (FLWS) 21 for detecting the rotation speed of a front left wheel of the motor vehicle, a second wheel speed sensor (FRWS) 22 for detecting a rotation speed of a front right wheel, a third wheel speed sensor (RLWS) 23 for a rear left wheel, a fourth wheel speed sensor (RRWS) 24 for a rear right wheel, a so-called G-sensor 25 for detecting acceleration/deceleration of the motor vehicle and a brake lamp switch 26 which serves for generating a signal indicative of application of brake.

An anti-skid brake controller 30 which constitutes a second control means dedicated for the anti-skid brake control is imparted with a function to generate a pseudo vehicle speed signal on the basis of the output signals of the wheel speed sensors 21 to 24 and the G-sensor 25 and at the same time generates a wheel brake actuation signal on the basis of the pseudo vehicle speed signal and the output of the brake lamp switch 26. More specifically, the anti-skid brake controller 30 equally implemented as based on a microcomputer includes a vehicle speed estimation circuit 31 which estimates the vehicle speed on the basis of the outputs of the wheel speed sensors 21 to 24 and that of the G-sensor 25 to thereby generate the pseudo vehicle speed signal, a wheel select circuit 32 for selecting one of the rear wheels whose rotation speed is lower than the other on the basis of the output signals from the wheel speed sensors 23 and 24 to thereby output the rotation speed of the selected rear wheel, and a control end decision circuit 33 for deciding the end of the control operation of the anti-skid brake system on the basis of the output of the vehicle speed estimation circuit 31 and that of the stop lamp switch 26.

Further, the second microcomputer-based controller 30 includes a slip ratio/deceleration calculating circuit 34 for arithmetically determining or calculating a slip ratio and deceleration on the basis of the output of the front left wheel speed sensor 21 and that of the vehicle speed estimation circuit 31, a second slip ratio/deceleration calculating circuit 35 for calculating a slip ratio and deceleration on the basis of the output of the front right wheel speed sensor 22 and that of the vehicle speed estimation circuit 31, and a third slip ratio/deceleration calculating circuit 36 for calculating a slip ratio and deceleration on the basis of the output of the wheel speed select circuit 32 and that of the vehicle speed estimation circuit 31.

Additionally, the anti-skid brake controller 30 includes a front left wheel control circuit 37 for determining a degree of brake effort to be applied to the front left wheel on the basis of the outputs of the first slip ratio/deceleration calculating circuit 34 and the control end decision circuit 33 to thereby generate a control signal (first brake actuation signal) for the front left wheel, a front right wheel control circuit 38 for determining a degree of brake effort to be applied to the front right wheel on the on the basis of the outputs of the second slip ratio/deceleration calculating circuit 35 and the control end decision circuit 33 to thereby generate a second control signal (second brake actuation signal) for the front right wheel, and a rear wheel control circuit 39 for determining a degree of brake effort to be applied to the rear wheels on the basis of the outputs of the third slip ratio/deceleration calculating circuit 36 and the control end decision circuit 33 to thereby generate a third control signal (third brake actuation signal) for the selected rear wheel.

The pseudo vehicle speed signal generated by the vehicle speed estimation circuit 31 incorporated in the anti-skid brake controller 30 is also supplied as the vehicle speed information to the microcomputer 4A of the powersteering controller 20 destined primarily for the powersteering control. Thus, it can be said that the microcomputer-based anti-skid brake controller 30 serves not only for the intrinsic anti-skid brake control but also plays a role in the power steering control.

Connected to an output terminal of the front left wheel control circuit 37 is a front left wheel solenoid brake valve 41 which is adapted for regulating a hydraulic pressure of the brake provided in association with the front left wheel under the control of the output signal of the front left wheel control circuit 37. Further, a front right wheel solenoid brake valve 42 is provided to regulate or adjust a hydraulic pressure of a brake for the front right wheel in accordance with the output signal of the front right wheel control circuit 38. Additionally, a rear wheel solenoid brake valve 43 is provided in association with the brakes for the rear wheels for the purpose of regulating the hydraulic pressure in accordance with the output signal of the rear wheel control circuit 39.

At this juncture, it should be noted that the fail-safe relay 6 mentioned hereinbefore in conjunction with the power steering control apparatus known heretofore may be provided in association with the anti-skid brake system. In other words, a pair of fail-safe relays may be provided in association with the controllers 10 and 30 for the power steering control and the anti-skid brake control, respectively, alternatively or a single fail-safe relay may be provided in common to the power steering controller 20 and the anti-skid brake controller 30 so that the fail-safe relay is electrically energized when the conditions for energization of the fail-safe relay as decided by both controllers 20 and 30 coincide with each other.

Next, description will be directed to operation of the power steering control apparatus according to the first embodiment of the invention.

Upon starting of the motor vehicle, the microcomputer 4A of the power steering controller 20 makes decision on the basis of the output signals of the various sensors mentioned above as to whether the power steering control apparatus operates normally. When the power steering control apparatus is in the normal state, the first microcomputer 4A produces the fail-safe relay energizing signal to thereby energize the fail-safe relay 6, as a result of which an electric power is supplied to the motor driving circuit 8 and the clutch driving circuit 10, etc. from the battery 7.

Similarly, the second microcomputer-based controller 30 checks the anti-skid brake system on the basis of the relevant sensor outputs upon starting of the motor vehicle. When the anti-skid brake system suffers no abnormality, the anti-skid brake controller 30 generates the fail-safe relay energization signal for energizing the associated fail-safe relay (not shown) to thereby allow the electric power to be supplied from the battery 7 to valve driving circuits (not shown) and hydraulic units provided in association with the solenoid valves 41 to 43, respectively.

The microcomputer 4A supplies a clutch actuation command signal to the clutch driving circuit 10, which responds to the command signal to supply a driving signal undergone a pulse width modulation to the electromagnetic clutch 11. In this conjunction, it should be mentioned that a clutch current is fed back to the clutch driving circuit 10 for the purpose of abnormality detection.

In the ordinary running state of the motor vehicle where there arises no necessity to apply a hard brake (e.g., emergency brake) to the motor vehicle, i.e., where the wheel lock phenomenon is unlikely to occur, the microcomputer 4A fetches the steering torque information from the output of the torque sensor 1 via the interface 3 and at the same time fetches the pseudo vehicle speed information from the vehicle speed estimation circuit 31 constituting a part of the anti-skid brake controller 30. This pseudo vehicle speed information is determined on the basis of the output signals of the wheel speed sensors 21 to 24. The microcomputer 4A determines the driving direction (i.e., direction of rotation) of the DC motor 9 on the basis of the steering torque information while determining the driving torque of the DC motor 9 on the basis of both the steering torque information and the pseudo vehicle speed information, whereby a driving direction command and a torque command for the DC motor 9 are generated on the basis of the driving direction and the driving torque as determined.

In this manner, in the normal running condition of the motor vehicle, the pseudo vehicle speed information output from the vehicle speed estimation circuit 31 is determined directly on the basis of the detection signals output from the front left wheel speed sensor 21, the front right wheel speed sensor 22, the rear left wheel speed sensor 23 and the rear right wheel speed sensor 24. The motor driving circuit 8 generates the driving signal on the basis of the direction signal and the torque signal mentioned above for driving the DC motor 9.

On the other hand, in the case where the motor vehicle is decelerated steeply or abruptly or where the wheels are locked due to application of the hard brake in the course of running on a slippery road such as a snow-covered road, the microcomputer 4A fetches the steering torque information from the output of the torque sensor 1 via the interface 3 and at the same time fetches as the vehicle speed information the pseudo vehicle speed signal which is output from the vehicle speed estimation circuit 31 of the second microcomputer-based controller 30 and which is determined by the circuit 31 from the output signals of the wheel speed sensors 21 to 24 generated immediately before the wheels are locked in consideration of the output signal of the G-sensor 25, whereon the microcomputer 4A determines the driving direction of the DC motor 9 on the basis of the steering torque information while determining the driving torque of the DC motor 9 on the basis of both the steering torque information and the vehicle speed information for thereby generating a direction signal and a torque signal for the DC motor 9 on the basis of the driving direction and the driving torque as determined.

The motor driving circuit 8 generates a driving signal on the basis of the direction signal and the torque signal supplied from the microcomputer 4A, the driving signal being then supplied to the DC motor 9.

As is apparent from the above description, when the wheels are locked, indicating that the motor vehicle is abruptly decelerated due to application of the hard brake, the pseudo vehicle speed as generated the anti-skid brake controller 30 decreases steeply. On the other hand, when deceleration of the motor vehicle is low, indicating that the motor vehicle is stopped gently with a gradual depression of the brake pedal, the estimated vehicle speed decreases slowly and progressively. In this manner, an appropriate steering operation assisted properly by the powersteering control apparatus can constantly be realized so as to conform with the road condition, whereby safety can be ensured for the motor vehicle even when the wheels are locked due to the hard brake applied in the course of running on a slippery road such as a snow-covered road or the like.

Parenthetically, the microcomputer-based anti-skid brake controller 30 for the anti-skid brake system serves for the same functions as is those of the conventional anti-skid brake system. More specifically, the vehicle speed estimation circuit 31 fetches the outputs of the wheel speed sensors 21 to 24 and the G-sensor 25 to generate the pseudo vehicle speed signal which is supplied to the slip ratio/deceleration calculating circuits 34 to 36, while the wheel speed select circuit 32 fetches the outputs of the rear wheel speed sensors 23 and 24 to select the sensor output indicating a lower wheel speed. The selected wheel speed sensor signal is then supplied to the third slip ratio/deceleration calculating circuit 36.

The first slip ratio/deceleration calculating circuit 34, the second slip ratio/deceleration calculating circuit 35 and the third slip ratio/deceleration calculating circuit 36 calculate the slip ratios and decelerations of the respective wheels, the results of which are supplied to the associated control circuits 37, 38 and 39, respectively.

The control end decision circuit 33 makes decision on the basis of the outputs of the vehicle speed estimation circuit 31 and the brake lamp switch 26 as to whether the control operation of the anti-skid brake system has come to an end. When the control operation of the anti-skid brake system is ended, i.e., when the pseudo vehicle speed signal equivalent to the output levels of the wheel speed sensors 21 to 24 is input to the vehicle speed estimation circuit 31 and when the output of the brake lamp switch 26 is, for example, "0", indicating that the brake is not applied, a decision signal indicating the end of operation of the anti-skid brake system is output to the wheel control circuits 37, 38 and 39, respectively.

On the other hand, unless the control operation of the anti-skid brake system is ended, the pseudo vehicle speed signal determined by the vehicle speed estimation circuit 31 from the output levels of the wheel speed sensors 21 to 24 on the basis of the output of the G-sensor 25 immediately before occurrence of locking of the wheels is input to the control end decision circuit 33. In that case, when the output of the brake lamp switch 26 is "1", indicating that the brake is applied, the control end decision circuit 33 outputs to the front left wheel control circuit 37, the front right wheel control circuit 38 and the rear wheel control circuit 39, respectively, the decision signal indicating that the control operation of the anti-skid brake system is not ended.

Thus, when the control operation of the anti-skid brake system is not effected, the front left wheel control circuit 37 and the front right wheel control circuit 38 deenergize the associated solenoid valves 41 and 42 to thereby allow the hydraulic pressure to increase, as a result of which braking forces are applied to the front left and right wheels in accordance with the depth of depression of the brake pedal. Similarly, the rear wheel control circuit 39 responds to the signal indicating the end of the control operation of the anti-skid brake system to deenergize the associated solenoid valve 43 for allowing the hydraulic pressure to increase, as a result of which a brake force is applied to the rear wheel of lower rotation speed as selected by the wheel speed select circuit 32 in accordance with the depth of depression of the brake pedal.

On the other hand, when the control operation of the anti-skid brake system is not ended, the front left and right wheel control circuits 37 and 38 energize the respective solenoid valves 41 and 42 to thereby allow the hydraulic pressure to be lowered so that the braking efforts are applied to the front left and right wheels to such extent that these wheels are prevented from being locked. Similarly, the rear wheel control circuit 39 deenergizes the associated solenoid valve 43 to thereby lower the hydraulic pressure so that a braking effort is applied to the rear wheel of the lower rotation speed without incurring the locking thereof.

As is apparent from the foregoing description, with the power steering control apparatus according to the instant embodiment in which the pseudo vehicle speed signal generated by the microcomputer-based controller 30 for the anti-skid brake system is fetched as the vehicle speed information, wherein the driving direction and the driving torque are determined on the basis of the vehicle speed information as fetched and the steering information derived from the torque sensor 1, there is always available an appropriate assist force which can ensure a correct or proper steering force conforming to the prevailing road condition and hence the safety for the motor vehicle even when the wheels are locked due to hard brake applied in the course of running on the slippery road such as a snow-covered road.

Embodiment 2

Figure 2:
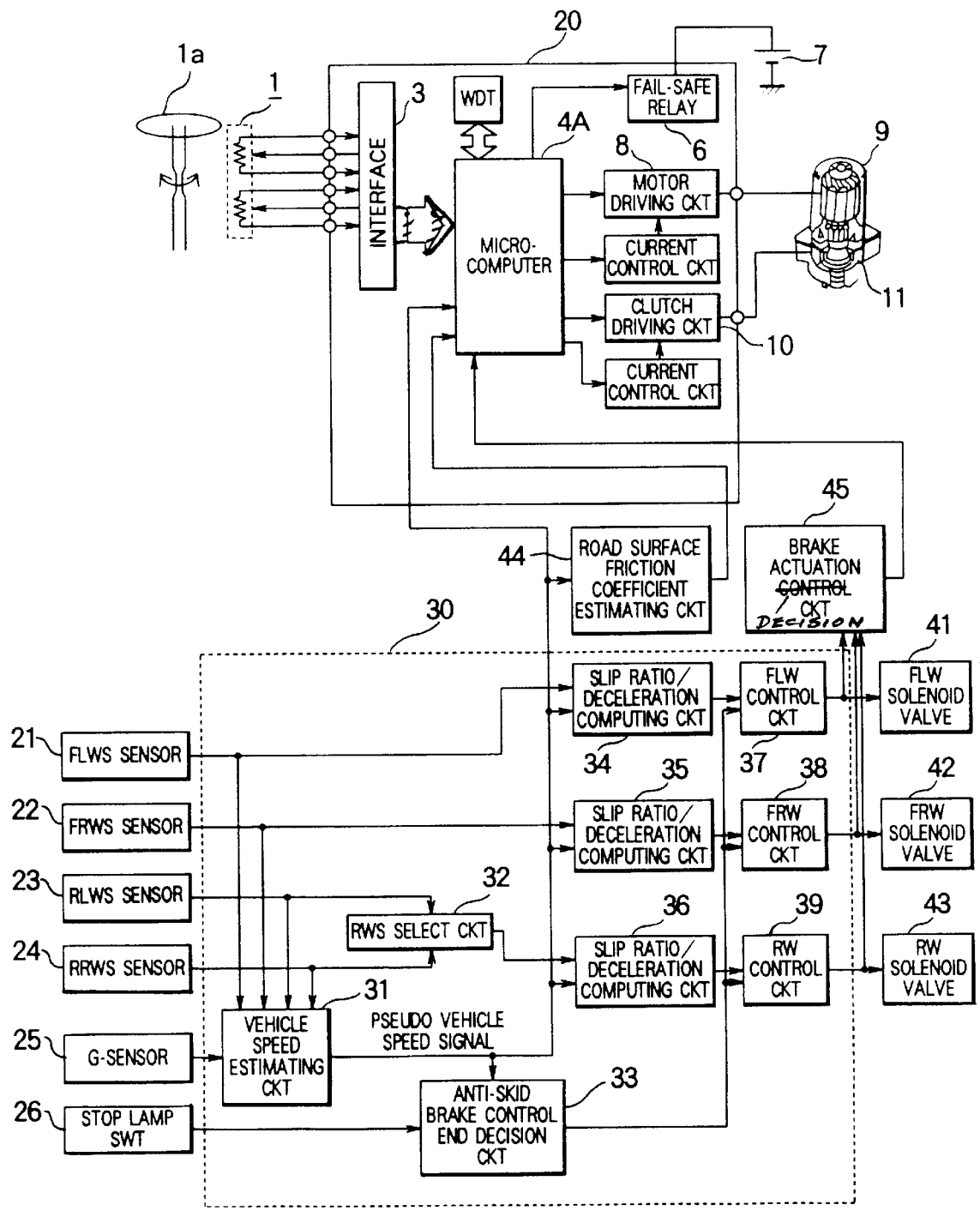
FIG. 2 is a block diagram showing a structure of a power steering control apparatus according to another embodiment of the present invention.
Figure 3:
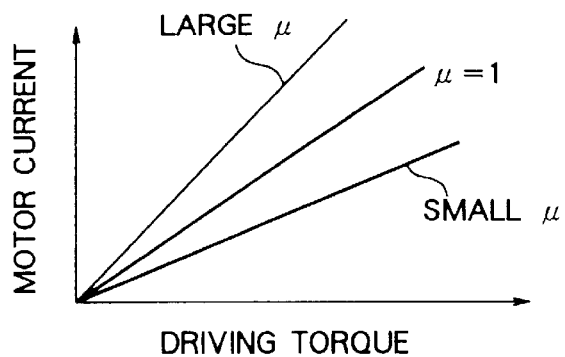
FIG. 3 is a view for graphically illustrating steering assist characteristics.

FIG. 2 is a diagram showing a structure of the power steering control apparatus according to a second embodiment of the present invention, which differs from the first embodiment in that a function for altering the assist characteristics (driving torque characteristic and the driving direction characteristic) of the power steering control apparatus when the wheel lock phenomenon is about to take place due to application of hard brake in the course of running on a slippery road such as a snow-covered road, i.e., when the anti-skid brake system is operating. In FIG. 2, parts or components same as or equivalent to those shown in FIG. 1 are denoted by like reference symbols and repeated description thereof is omitted.

According to the teachings of the invention incarnated in the power steering control apparatus of the second embodiment, there are additionally provided a road surface friction coefficient estimating circuit 44 having an input connected to the output of the vehicle speed estimation circuit 31 for estimating a coefficient $\mu$ of friction of a road surface on the basis of the output of the vehicle speed estimating circuit 31 and a brake actuation decision circuit 45 for deciding whether brake actuation signals are being output as the control signal from the control circuits 37 to 39 incorporated in the anti-skid brake controller 30.

The friction coefficient $\mu$ of the road surface as determined by the road surface friction coefficient estimation circuit 44 usually assumes a value in a range of "0" (zero) to "1" (one), wherein the value "0" indicates a very slippery road surface on which the motor vehicle will not stop in spite of depression of the brake pedal, while the value "1" of the friction coefficient represents a non-slippery road surface where the motor vehicle can be stopped substantially at once in response to application of the brake.

The outputs of the road surface friction coefficient estimation circuit 44 and the brake actuation decision circuit 45 are supplied to the microcomputer 4A of the power steering controller 20 Although the road surface friction coefficient estimation circuit 44 and the brake actuation decision circuit 45 are provided as the discrete components, the functions thereof may be realized by the microcomputer 4A as a modification of the instant embodiment.

Now description will turn to operation of the power steering control apparatus according to the instant embodiment.

Upon starting of the motor vehicle, the microcomputer 4A of the power steering controller 20 makes decision on the basis of the output signals of the various sensors mentioned hereinbefore in conjunction with the first embodiment as to whether the power steering control apparatus operates normally. When the power steering control apparatus is in the normal state, the microcomputer 4A produces the fail-safe relay energizing signal to thereby energize the fail-safe relay 6, as a result of which an electric power is supplied to the motor driving circuit 8 and the clutch driving circuit 10, etc. from the battery 7.

Similarly, the microcomputer-based anti-skid brake controller 30 checks the anti-skid brake system on the basis of the relevant sensor outputs upon starting of the motor vehicle. When the anti-skid brake system suffers no abnormality, the anti-skid brake controller 30 generates the fail-safe relay energization signal for energizing the associated fail-safe relay (not shown) to thereby allow the electric power to be supplied from the battery 7 to valve driving circuits (not shown) and hydraulic units provided in association with the solenoid valves 41 to 43, respectively.

The microcomputer 4A supplies a clutch actuation command signal to the clutch driving circuit 10, which responds to the command signal to supply a driving PWM signal to the electromagnetic clutch 11. As mentioned hereinbefore, a clutch current is fed back to the clutch driving circuit 10 for the purpose of abnormality detection.

In the normal running state of the motor vehicle where there arises no necessity to apply a hard brake (e.g., emergency brake) to the motor vehicle, i.e., where the anti-skid brake control need not be effectuated, the microcomputer 4A fetches the steering torque information from the output of the torque sensor 1 via the interface 3 and at the same time fetches as the vehicle speed information the pseudo vehicle speed information from the vehicle speed estimation circuit 31 of the anti-skid brake controller 30. This pseudo vehicle speed information is determined on the basis of the output signals of the wheel speed sensors 21 to 24, as mentioned previously. The microcomputer 4A determines the driving direction (i.e., direction of rotation) of the DC motor 9 on the basis of the steering torque information while determining the driving torque of the DC motor 9 on the basis of both the steering torque information and the pseudo vehicle speed information.

At that time, the microcomputer 4A makes reference to a control reference map stored previously in a memory (not shown) incorporated in the controller 20 on the basis of the driving direction and the driving torque mentioned above to thereby read out as reference values a driving direction and a driving torque corresponding to the road surface friction coefficient $\mu$ of "1" and determines steering assist quantities, to thereby generate a direction signal and a torque signal corresponding to the assist quantities, which signals are then used as the control quantities for the DC motor 9.

Thus, in the ordinary or normal operation of the motor vehicle, the pseudo vehicle speed information output from the vehicle speed estimation circuit 31 is determined directly on the basis of the detection signals output from the front left wheel speed sensor 21, the front right wheel speed sensor 22, the rear left wheel speed sensor 23 and the rear right wheel speed sensor 24. The motor driving circuit 8 generates the driving signal on the basis of the direction signal and the torque signal mentioned above for driving the DC motor 9.

On the other hand, in the case where the motor vehicle is decelerated steeply or where the wheels are locked due to application of the hard brake in the course of running on a slippery road such as a snow-covered road, i.e., when the anti-skid brake control system is operating, the microcomputer 4A fetches the steering torque information from the output of the torque sensor 1 via the interface 3 and at the same time fetches as the vehicle speed information the pseudo vehicle speed signal which is output from the vehicle speed estimation circuit 31 of the anti-skid brake controller 30 and which is determined by the circuit 31 on the basis of the output signals of the wheel speed sensors 21 to 24 generated immediately before the wheels are locked and the output signal of the G-sensor 25, whereon the microcomputer 4A determines the driving direction of the DC motor 9 on the basis of the steering torque information while determining the driving torque of the DC motor 9 on the basis of both the steering torque information and the vehicle speed information.

Further, the microcomputer 4A corrects or alters the assist characteristics of the power steering controller 20 by multiplying the reference value read out from the control reference map by the estimated value of the friction coefficient $\mu$ output from the road surface friction coefficient estimation circuit 44 at that time, to thereby determine the assist quantities for the DC motor 9 and generate a direction signal and a torque signal corresponding to the assist quantities.

The motor driving circuit 8 generates a driving signal on the basis of the direction signal and the torque signal supplied from the microcomputer 4A, the driving signal being then supplied to the DC motor 9.

FIG. 2 is a view for illustrating graphically relations between the driving torque and a motor current supplied to the DC motor 9 with the road surface friction coefficient $\mu$ being used as a parameter. Referring to FIG. 2, when it is assumed that the driving torque characteristic curve corresponding to the value "1" of the friction coefficient $\mu$ represents the reference driving torque characteristic, the slope of the driving torque characteristic curve becomes gentler as the friction coefficient $\mu$ becomes smaller, i.e., as the road surface is more slippery. On the other hand, when the friction coefficient $\mu$ increases, i.e., as the road surface is less slippery, the slope of the driving torque characteristic curve becomes more steep.

Thus, the microcomputer 4A multiplies the reference values read out from the control reference map by an estimated value of the road surface friction coefficient as supplied from the road surface friction coefficient estimation circuit 44 to thereby decrease the slope of the driving torque characteristic curve and hence the assist quantities when the road is slippery while increasing the slope of the torque characteristic curve and hence the assist quantities when the road surface is less slipper.

Figure 4:
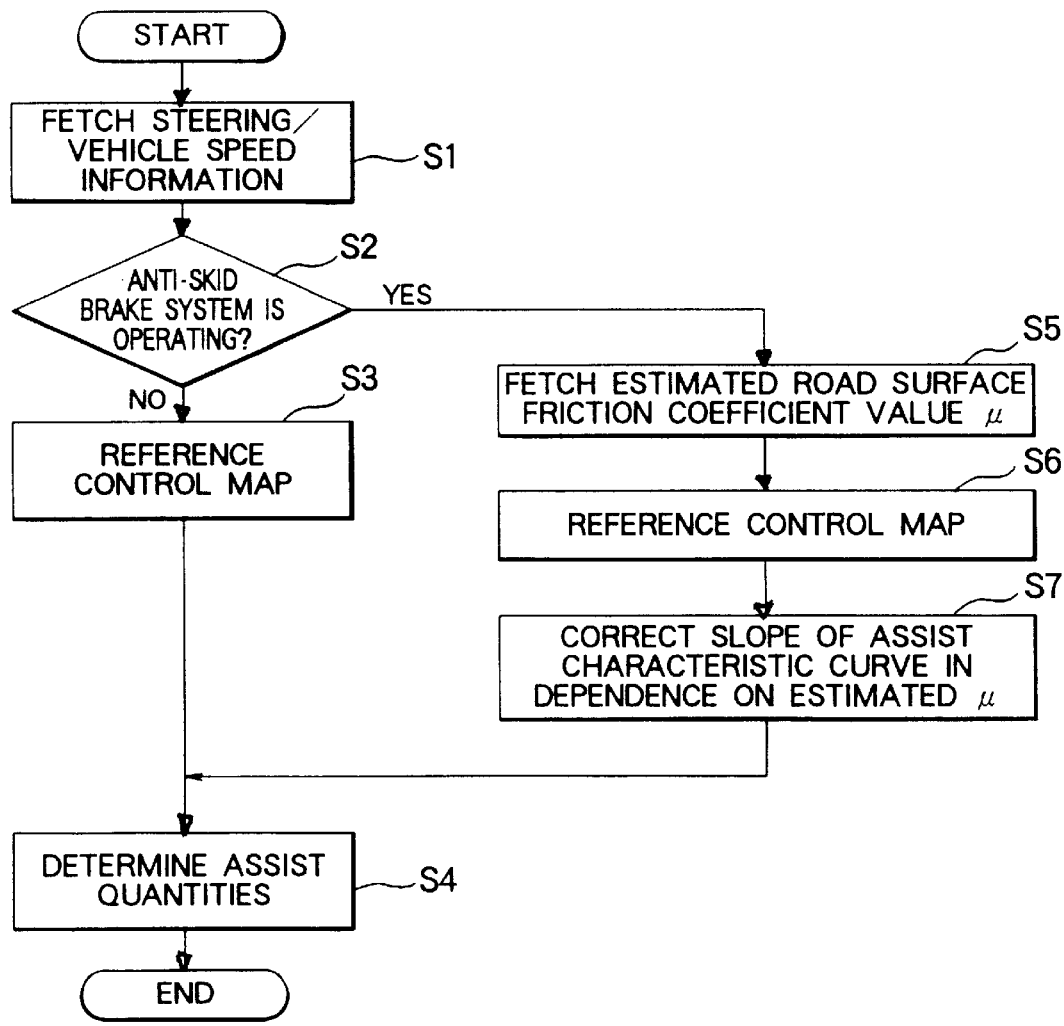
FIG. 4 is a flow chart for illustrating operation of the power steering control apparatus shown in FIG. 2.

FIG. 4 is a flow chart for illustrating the assist quantity determining routine executed by the microcomputer 4A.

Referring to FIG. 4, in a step S1, the driving direction and the driving torque are determined on the basis of the steering torque information fetched from the torque sensor 1 and the pseudo vehicle speed signal fetched from the anti-skid brake controller 30, which is followed by a step S2 where decision is made on the basis of the output signal from the brake actuation decision circuit 45 as to whether the anti-skid brake system is operating.

When the decision step S2 results in negation (NO), indicating a normal running state of the motor vehicle where there is no need for stopping the motor vehicle at once by applying the hard brake, the microcomputer 4A refers the control reference map stored previously in the memory (not shown) incorporated in the power steering assist controller 20 (step S3) to read out as reference values the driving direction and the driving torque corresponding to the value "1" of the road surface friction coefficient $\mu$ and determine the corresponding assist quantities for the DC motor 9 in a step S4.

On the other hand, when it is decided in the step S2 that the anti-skid brake system is operating, indicating that the wheels of the motor vehicle are likely to be locked due to application of hard brake on a road of slippery surface such as a snow-covered road, the microcomputer 4A fetches an estimated value of the road surface friction coefficient $\mu$ output from the road surface friction coefficient estimation circuit 44 in a step S5, which is then followed by a step S6 where the control reference map is referenced to read out the reference value and multiply it with the estimated friction coefficient value fetched in the step S5, to thereby correct the assist characteristic and hence the assist quantities.

More specifically, assuming that the driving torque characteristic which is one of the assist characteristics is to be corrected or altered, the reference driving torque characteristic corresponding to the value "1" of the road surface friction coefficient is multiplied with the estimated value of the friction coefficient $\mu$ output from the road surface friction coefficient estimation circuit 44, whereby the driving torque characteristic is so controlled that the slope of the characteristic curve becomes gentler as the friction coefficient $\mu$ is smaller or as the road surface is more slippery, while the characteristic curve slope becomes steeper as the friction coefficient is greater or as the road surface is less slippery (refer to FIG. 2).

Parenthetically, the controller 30 for the anti-skid brake system serves for the same functions as the conventional anti-skid brake controller. Since operation of this controller 30 has been described in detail in conjunction with the first embodiment of the invention, any further description will be unnecessary.

As is apparent from the above description, when the wheels are likely to be locked, indicating that the motor vehicle is decelerated steeply due to application of the hard brake (i.e., when the anti-skid brake system is operative) in the course of running on a slippery road, the microcomputer 4A decreases the assist quantities for the power steering in dependence on the road conditions to thereby make more difficult the manipulation or handling of the steering wheel and hence ensure stability of the steering operation.

Many features and advantages of the present invention are apparent form the detailed description and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described.

By way of example, as a modification of the first embodiment described above, only the driving torque of the DC motor 9 may be determined on the basis of the vehicle speed information and the steering information with determination of the driving direction being spared, to the substantially same effect.

Further, although it has been described in conjunction with the second embodiment of the invention that when the anti-skid brake system is operating, i.e., when the brake actuation signal is being issued, the steering assist characteristics including the driving torque characteristic and the driving direction characteristic are altered or changed in accordance with the friction coefficient $\mu$ of the road surface, the assist characteristics may be corrected or modified independent of the road surface friction coefficient $\mu$ when the brake actuation signal is being issued.

Additionally, although it has been described that the assist characteristics include the driving torque characteristic and the driving direction characteristic, the assist characteristic may include only the driving torque characteristic.

In conjunction with the first embodiments, a plurality of control reference maps for different conditions of road surfaces, respectively, may be prepared instead of the single control reference map, so that the control reference map corresponding to the condition of a road on which the motor vehicle is currently running can be consulted to determine the assist characteristic.

Moreover, the anti-skid brake system of another structure than that described above may equally be employed to the substantially same effect. Besides, instead of the pseudo vehicle speed signal, an output signal of a conventional vehicle speed sensor may be utilized in the power steering control apparatus. In that case, the power steering control apparatus can operate even in the motor vehicle which is not equipped with the anti-skid brake system.

Accordingly, it should be understood that numerous suitable modifications and equivalents may be resorted to within the scope of the invention.

We claim:

1. A power steering control apparatus for a motor vehicle, comprising:

first control means for determining a driving torque for a steering assist motor on the basis of steering torque information, indicative of a steering torque of a steering wheel generated upon operation of the steering wheel by a driver of the motor vehicle, and pseudo vehicle speed information indicative of an estimated vehicle speed, and then generating a driving signal for said steering assist motor on the basis of said driving torque; and second control means for generating said pseudo vehicle speed information indicative of an estimated speed of said motor vehicle which is calculated on the basis of wheel rotation speed information indicative of a rotation speed of wheels of said motor vehicle and acceleration/deceleration information of said motor vehicle indicative of an acceleration/deceleration of said motor vehicle, said second control means also generating a brake actuation signal for said wheels of said motor vehicle on the basis of said pseudo vehicle speed signal, said acceleration/deceleration information, and brake application information indicative of brake application by a driver of the motor vehicle;

wherein said second control means comprises a part of an anti-skid brake system for said motor vehicle;

and wherein said anti-skid brake system includes a vehicle speed estimating circuit for generating said pseudo vehicle speed information on the basis of outputs of rotation speed sensors which are provided in association with wheels of said motor vehicle for detecting rotation speeds thereof, respectively, and an output signal of a deceleration/acceleration sensor for detecting a deceleration/acceleration of said motor vehicle;

and wherein said pseudo vehicle speed information defines a locking state and a ready-to-lock state of the wheels of said motor vehicle, and said first control means decreases said driving torque in response to the pseudo vehicle speed information which indicates a locking state or alternatively a ready-to-lock state of the wheels of said motor vehicle.

2. A power steering control apparatus for a motor vehicle comprising:

first control means for determining a driving torque of a steering assist motor on the basis of steering torque information, which is generated upon steering of a steering wheel and indicative of a steering torque imparted to said steering wheel by a driver of said motor vehicle, and vehicle speed information to thereby generate a driving signal for said steering assist motor on the basis of said driving torque;

second control means for generating a brake actuation signal for wheels of said motor vehicle on the basis of wheel rotation speed information and brake application effort detection information indicative of brake application by a driver of the motor vehicle;

road friction coefficient estimating means for estimating coefficient of friction of a road surface on the basis of said wheel rotation speed information;

means for storing a plurality of said steering control data representing relations between a motor current and a driving torque of said steering assist motor by using predetermined road friction coefficients as parameters; and means for changing said steering control data in dependence on the road friction coefficient estimated by said road coefficient estimating means by referencing said storing means;

wherein said first control means comprises a plurality of steering control data, each of which being changed for correspondingly controlling said steering assist motor in response to said brake actuation application signal output from said second control means;

and wherein said first control means comprises a plurality of steering control data, and whereby the friction coefficient of the road surface estimated by said road friction coefficient estimating means is communicated to said first control means to correspondingly change said steering control data.

* * * * *